US008349507B2

(12) United States Patent
Lerner et al.

(10) Patent No.: US 8,349,507 B2
(45) Date of Patent: Jan. 8, 2013

(54) IMPLEMENTATION OF AN ENGINE CONTROLLER UNIT'S NON-VOLATILE MEMORY FOR MEASURING THE TIME OF A FUEL CELL SYSTEM IN A SHUT-OFF OR STANDBY STATE

(75) Inventors: Seth E. Lerner, Honeoye Falls, NY (US); Abdullah B. Alp, West Henrietta, NY (US); Rebecca Ann Dinan, Rochester, NY (US); David A. Arthur, Honeoye Falls, NY (US)

(73) Assignee: GM Global Technology Operations LLC, Detroit, MI (US)

(*) Notice: Subject to any disclaimer, the term of this patent is extended or adjusted under 35 U.S.C. 154(b) by 1606 days.

(21) Appl. No.: 11/853,425

(22) Filed: Sep. 11, 2007

(65) Prior Publication Data

US 2010/0266912 A1 Oct. 21, 2010

(51) Int. Cl.
*H01M 8/04* (2006.01)
(52) U.S. Cl. ........................... 429/429; 429/428
(58) Field of Classification Search ........................ None
See application file for complete search history.

(56) References Cited

U.S. PATENT DOCUMENTS

| | | | | |
|---|---|---|---|---|
| 4,985,694 A * | 1/1991 | Sunami | ................... | 340/426.28 |
| 6,531,872 B1 | 3/2003 | Carr et al. | | |
| 7,582,370 B2 | 9/2009 | Goto et al. | | |
| 2007/0026277 A1* | 2/2007 | Ogawa et al. | ................... | 429/22 |
| 2008/0182138 A1* | 7/2008 | Salvador et al. | ................ | 429/13 |
| 2009/0197129 A1 | 8/2009 | Shimoi et al. | | |

* cited by examiner

*Primary Examiner* — Ula C Ruddock
*Assistant Examiner* — Tony Chuo
(74) *Attorney, Agent, or Firm* — John A. Miller; Miller IP Group, PLC

(57) ABSTRACT

A method for providing an accurate time that a fuel cell system has been shut-down so that the gas constituents in the anode and cathode side of the fuel cell stack can be known for an efficient next system start-up sequence. The method uses two timers, a stand-by timer that provides a time count for how long the fuel cell system has been off, but the vehicle ignition is still on, and a shut-off timer that provides a time count of how long the vehicle ignition has been off. The two time counts are added to give a complete time count of how long the fuel cell stack has been shut-down.

16 Claims, 3 Drawing Sheets

IMPLEMENTATION OF AN ENGINE CONTROLLER UNIT'S NON-VOLATILE MEMORY FOR MEASURING THE TIME OF A FUEL CELL SYSTEM IN A SHUT-OFF OR STANDBY STATE

BACKGROUND OF THE INVENTION

1. Field of the Invention

This invention relates generally to a method for determining the time a fuel cell system has been shut-down and, more particularly, to a method for determining how long a fuel cell system in a vehicle has been shut-down that includes combining a stand-by timer that provides a time count when the vehicle ignition is still on, but the fuel cell system is off, and a shut-off timer that provides a time count when the vehicle ignition is off.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

It has been proposed in the art to provide stack order switching or anode flow-shifting in a fuel cell system that employs split stacks. Particularly, valves and plumbing in the system are provided so that the anode exhaust gas exiting a first sub-stack is sent to the anode side of a second sub-stack, and the anode exhaust gas exiting the second sub-stack is sent to the anode side of the first sub-stack in a cyclical manner.

When a fuel cell system is shut down, un-reacted hydrogen gas remains in the anode side of the fuel cell stack. This hydrogen gas is able to diffuse through or cross over the membrane and react with the oxygen in the cathode side. As the hydrogen gas diffuses to the cathode side, the total pressure on the anode side of the stack is reduced below ambient pressure.

This pressure differential draws air from ambient into the anode side of the stack. When the air enters the anode side of the stack it generates a hydrogen/air front that creates a short circuit in the anode side, resulting in a lateral flow of hydrogen ions from the hydrogen flooded portion of the anode side to the air-flooded portion of the anode side. This high ion current combined with the high lateral ionic resistance of the membrane produces a significant lateral potential drop (~0.5 V) across the membrane. This produces a local high potential between the cathode side opposite the air-filled portion of the anode side and adjacent to the electrolyte that drives rapid carbon corrosion, and causes the carbon layer to get thinner. This decreases the support for the catalyst particles, which decreases the performance of the fuel cell.

At the next system start-up, assuming enough time has gone by, both the cathode and anode flow channels are generally filled with air. When hydrogen is introduced into the anode flow channels at system start-up, the hydrogen pushes out the air in the anode flow channels also creating a hydrogen/air front that travels through the anode flow channels. The hydrogen/air front causes a catalytic reaction along the length of the membrane in each fuel cell as the front moves that, in combination with the reaction across the membrane, creates a high electric voltage potential. This combined electric voltage potential is high enough to severely degrade the catalyst and the carbon particles on which the catalyst is formed, reducing the life of the MEAs in the fuel cell stack. Particularly, the reaction created by the hydrogen/air front in combination with the normal fuel cell reaction is orders of magnitude greater than only the fuel cell reaction across the membrane. For example, it has been shown that without addressing the degradation effects of the hydrogen-air front at system start-up, it only takes about 100 shut-down and start-up cycles to destroy the fuel cell stack in this manner.

It has been proposed in the art to reduce the degradation effect of the hydrogen/air front at system start-up by forcing hydrogen through the anode flow channels as quickly as possible so as to reduce the time that the degradation occurs. It has also been suggested to introduce hydrogen into the anode flow channels at a slow rate to provide active mixing of the air and hydrogen to eliminate the hydrogen/air front. It has also been proposed in the art to cool the fuel cell before removing the hydrogen from the anode flow channels. However, all of these solutions have not reduced the hydrogen/air degradation enough to provide a desired lifetime of the fuel cell stack. Particularly, moving the hydrogen/air front quickly does not completely eliminate the degradation of the catalyst, and requires over-sized piping and other components to rapidly purge the air from the anode flow channels. Introducing the hydrogen slowly at start-up has the disadvantage of requiring a recirculation pump that takes several minutes to completely remove the air from the anode flow channels.

Further, requiring precise control of the amount of hydrogen into the anode flow channels is difficult to implement.

It has also been proposed in the art to provide a load across the fuel cell stack, such as a resistor, to reduce the electric potential generated by the hydrogen/air front. However, an extremely low resistance load will require electrical components with a high power rating. Also, flow balancing between cells in a fuel cell stack can result in corrosion to the cell anodes. Furthermore, in most embodiments, a resistor is typically not sufficient on its own to minimize carbon corrosion.

Based on the discussion above, it is apparent that it is desirable to know the gas constituents in the anode and cathode side of a fuel cell stack at system start-up for a more efficient and safe start-up sequence. Simulations can be run to show what the gas constituents are in the fuel cell stack based on the time since the last system shut-down. Therefore, it is desirable to know how long a fuel cell stack has been shut-down.

SUMMARY OF THE INVENTION

In accordance with the teachings of the present invention, a method is disclosed for providing an accurate time that a fuel cell system has been shut-down so that the gas constituents in the anode and cathode side of the fuel cell stack can be known for an efficient next system start-up sequence. The method uses two timers, a stand-by timer that provides a time count for how long the fuel cell system has been off, but the vehicle ignition is still on, and a shut-off timer that provides a time count of how long the vehicle ignition has been off. The two time counts are added to give a complete time count of how long the fuel cell stack has been shut-down.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for determining how long a fuel cell system has been shut-down is merely exemplary in nature, and is in no way intended to limit the invention or its applications or uses.

Figure 1:
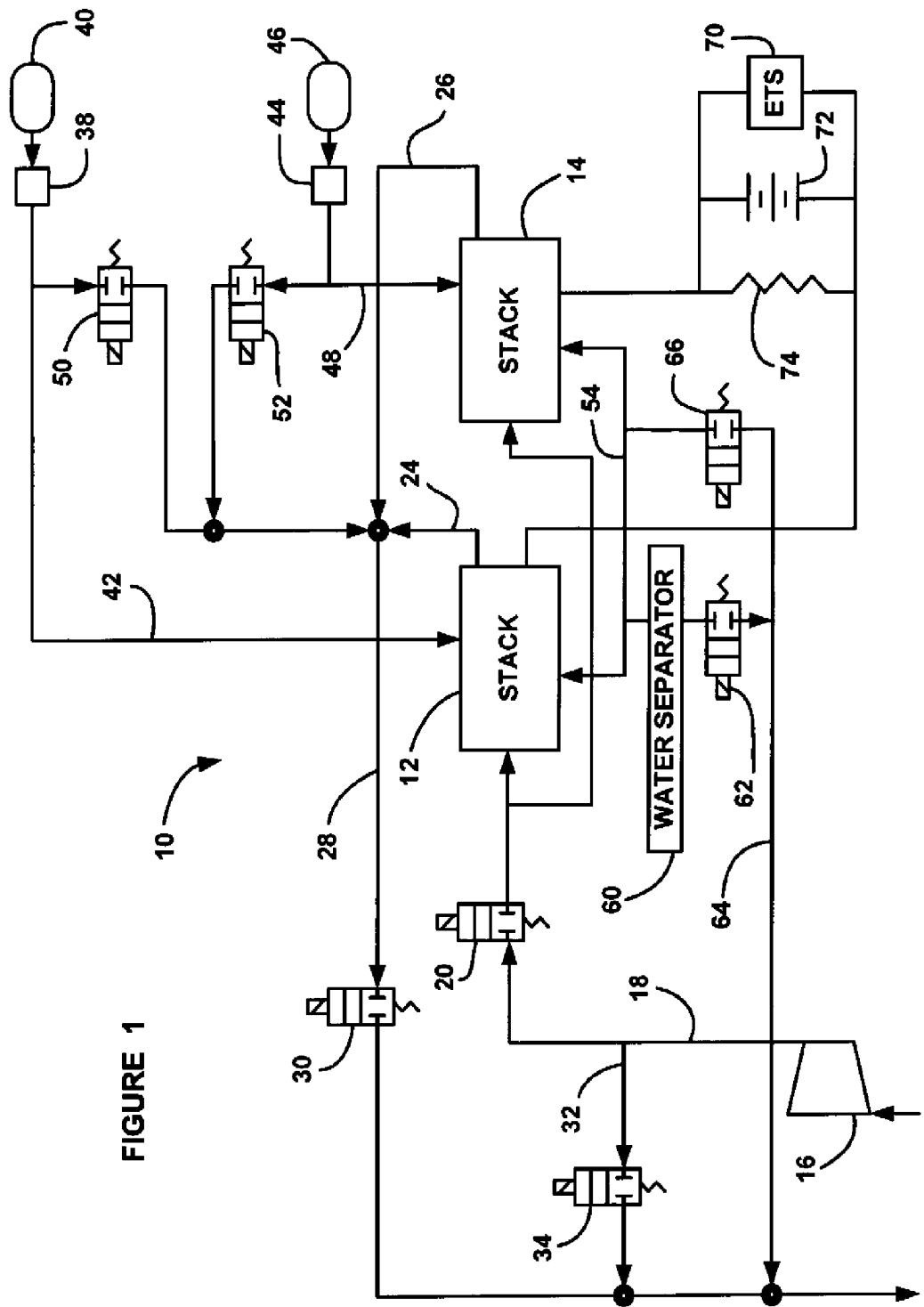
FIG. 1 is a schematic block diagram of a fuel cell system employing split stacks that operate by anode flow-shifting.

FIG. 1 is a schematic block diagram of a fuel cell system 10 including a first split fuel cell stack 12 and a second split fuel cell stack 14. A compressor 16 provides cathode input air on cathode input line 18 to the split stacks 12 and 14 through a normally closed cathode input valve 20. Cathode exhaust gas is output from the split stack on line 24 and cathode exhaust gas is output from the split stack 14 on line 26 where the cathode exhaust gas is combined into a single cathode output line 28. A normally closed cathode back pressure valve 30 controls the flow of the cathode exhaust gas through the line 28. A cathode by-pass line 32 between the input line 18 and the output line 28 allows the cathode input air to by-pass the stacks 12 and 14. A normally closed by-pass valve 34 controls whether the cathode air by-passes the stacks 12 and 14. If the valves 20 and 30 are closed and the valve 34 is open, then air from the compressor 16 will by-pass the stacks 12 and 14. Typically, a cathode humidification unit (not shown) will be provided at a suitable location in the cathode input line 18.

In this non-limiting embodiment, the split stacks 12 and 14 employ anode flow-shifting where the anode reactant gas flows back and forth through the split stacks 12 and 14 at a predetermined cycle in a manner that is well understood to those skilled in the art. An injector 38 injects hydrogen gas from a hydrogen gas source 40 through anode line 42 to the split stack 12 and an injector 44 injects hydrogen gas from a hydrogen source 46 through anode line 48 to the split stack 14 in an alternating sequence. Normally closed anode flow shifting valves 50 and 52 are used to provide the anode flow-shifting. When the valve 50 is closed and the valve 52 is opened, hydrogen gas from the source 40 flows into the stack 12 on the line 42, through a connector line 54 between the split stacks 12 and 14, into the split stack 14 and out the anode line 46 through the valve 52 to be mixed with the cathode exhaust gas in the cathode exhaust gas output line 28. Likewise, when the valve 52 is closed and the valve 50 is opened, hydrogen gas from the hydrogen source 46 flows into the split stack 14 on the line 46, through the connector line 54, into the split stack 12 and through the valve 50 to be mixed with the cathode exhaust gas in the line 28.

A water separator 60 is coupled to the connector line 54 and collects water in the anode gas flow between the split stacks 12 and 14. A normally closed drain valve 62 is periodically opened to vent the water to the cathode exhaust gas line 28 on line 64. Further, an anode exhaust gas purge valve 66 is coupled to the connector line 54 and the line 64 for reasons that will become apparent from the discussion below.

The fuel cell stacks 12 and 14 generate current. During normal stack operation, the current generated by the stacks 12 and 14 is used to drive system loads, such as an electrical traction system (ETS) 70 on a vehicle. During a shut-down sequence, the current generated by the stacks 12 and 14 may be used to charge a battery 72, or be dissipated by other system components, and then be dissipated by a resistor 74.

For one system shut-down sequence, the compressor 16 is stopped and the valves 20 and 30 are closed to seal the cathode side of the stacks 12 and 14. The flow of hydrogen is continued so that any remaining oxygen in the stacks 12 and 14 is consumed. When the stack power drops to a predetermined level, the current generated by the stacks 12 and 14 is switched from the ETS 70 to the battery 72. When the stack power decreases to another predetermined level, the stack load is switched to the resistor 74. Particularly, once the voltage has degraded to a fixed cutoff voltage, the stack load is switched to the resistor 74. The cutoff voltage could be the lower limit of a DC/DC converter (not shown), or the lower limit of a power device. The objective of the battery load is to consume and/or store any energy that otherwise would have been wasted. It also reduces the energy consumption requirements of the resistor load.

Once the oxygen has been consumed from the stacks 12 and 14, the hydrogen flow is turned off and the valves 50, 52, 62 and 66 are closed to seal the anode side of the stacks 12 and 14. When the system 10 is shut-down in this manner, the stacks 12 and 14 include an $N_2/H_2$ mixture in both the cathode side and the anode side. Over time, air will leak into the stacks 12 and 14, and the hydrogen in the stack 12 and 14 will initially consume the oxygen. Additionally, the hydrogen will slowly leak out of the stacks 12 and 14. As a result, the composition of the gases within the stacks 12 and 14 will vary over time between a hydrogen rich mixture in nitrogen and water to an air mixture.

According to the invention, a method is used to determine how long the fuel cell system 10 has been shut-down or a quick stop has occurred so that an estimate of the gas concentration and constituency in the split stacks 12 and 14 can be obtained for a proper start-up sequence. The approximate gas concentration in the cathode side and anode side can be predicted over time based on gas kinetics and assumptions about the system 10. By knowing the gas concentrations in the system during the time that the system 10 is in stand by or is keyed off, certain methods can be employed to ensure that an optimized next start-up sequence takes place. There are certain requirements that pertain to safety, emissions, reliability and durability that can be achieved by manipulating the states that defines the start-up sequence.

To accomplish this, the present invention proposes a stand-by timer that counts the time that the system 10 is off but the key is still in the vehicle ignition and is in the ON or accessory (ACC) position, and a shut-off timer that counts the time that the ignition is off. Therefore, both desired stops and quick stops of the system 10 can be covered to determine how much time has gone by since the last stack shut-down. When the system 10 is off, but the key is still in the ignition, the stand-by timer accumulates the time from when the system was shut-down. When the key is removed from the ignition, the stand-by time value is stored, and the shut-off timer is started. When the key is returned to the ignition and the system 10 is started, the stand-by time and the shut-off time are added to provide a complete off-time value for determining the gas concentration in the anode and cathode sides of the split stacks 12 and 14.

If the off-time value is less than 500 seconds, the hydrogen concentration is high on the anode side and is being consumed. The anode pressure will be decreasing rapidly due to a high oxygen consumption rate. If the off-time value is between 500 and 1000 seconds, the hydrogen concentration in the anode side has declined due to continued oxygen consumption. The anode pressure provides a large vacuum due to reduced hydrogen concentration. If the off-time value is between 1000 and 10,000 seconds, the hydrogen in the anode side has continued to decline as oxygen in the cathode diffuses back into the anode side. The cathode concentration starts to decline after it peaks. The anode pressure recovers as nitrogen in the air enters the anode side to offset the partial pressure difference. If the off-time value is great than 10,000 seconds, the hydrogen concentration in the anode side is low, but continues to diffuse from the anode side to the cathode side. The anode pressure achieves ambient pressure as air enters the anode side.

Figure 2:
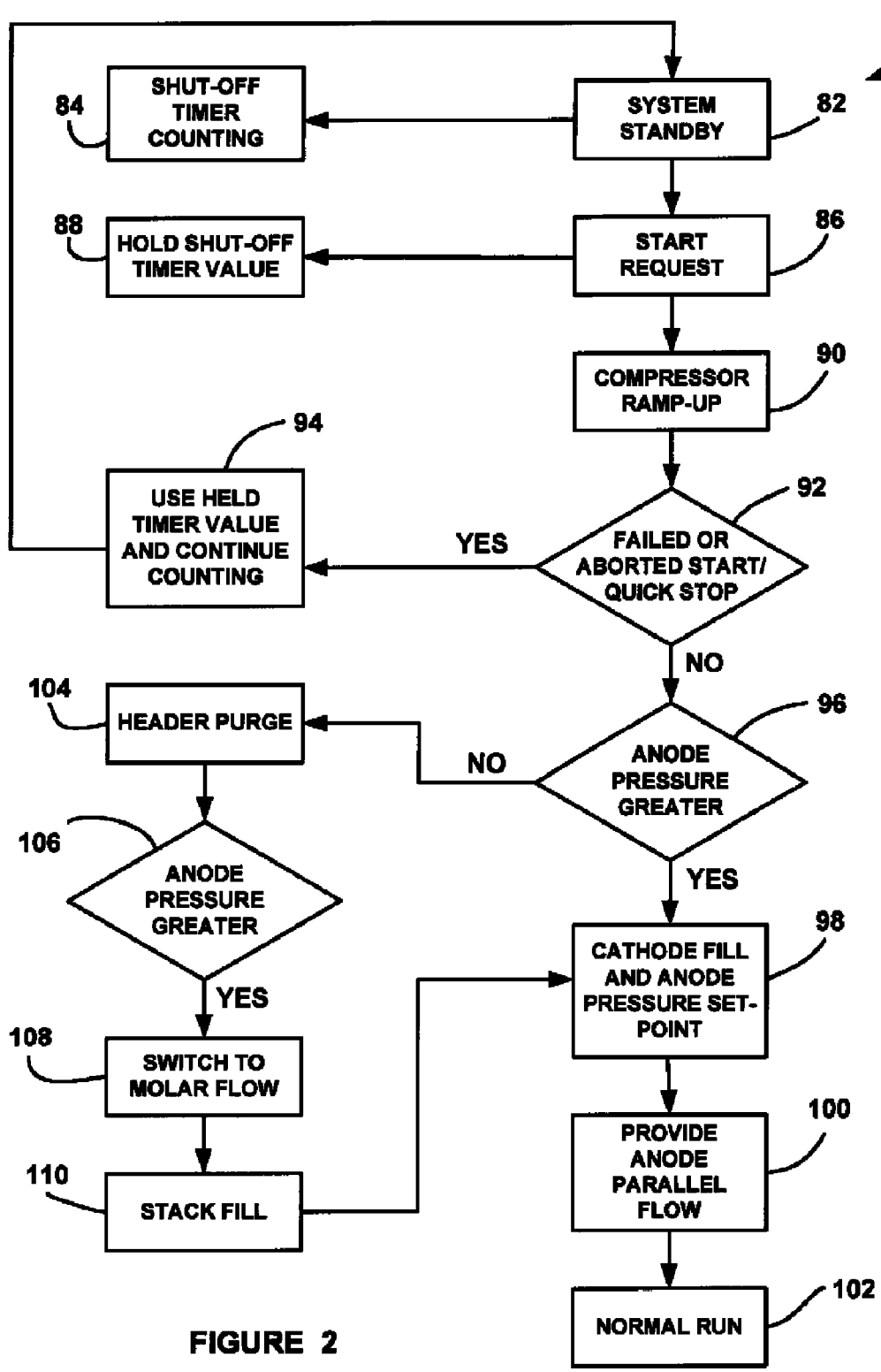
FIG. 2 is a flow chart diagram showing a fuel cell system start-up sequence that uses a time count of the invention.

FIG. 2 is a flow chart diagram showing a fuel cell system start-up process that employs the stand-by and shut-off time values. While the fuel cell system is in the off state at box 82, the shut-off timer is counting at box 84. The fuel cell system 10 receives a start request at box 86, and the system holds the shut-off time value at box 88. The compressor 16 is ramped up to provide dilution air at the stack output for the anode hydrogen gas from the anode side of the split stacks 12 and 14 at box 90. The system 10 determines whether a failed start, an aborted start, or a quick stop has occurred at decision diamond 92. If so, the shut-off timer resumes the count that has been held at box 94. If a failed start, aborted start or quick stop has not occurred at the decision diamond 92, the system 10 determines whether the anode pressure is greater than a predetermined value, such as 150 kPa, at decision diamond 96. If the anode pressure is greater than the predetermined value at the decision diamond 96, the system 10 proceeds to the next step in the start-up sequence that provides a cathode air fill to the cathode side of the split stacks 12 and 14 and provides a differential anode side pressure set-point at box 98. The system 10 then provides hydrogen gas flow to the anode side of the split stacks 12 and 14 in parallel at box 100, and provides a normal run operation at box 102.

If the anode side pressure is less than the predetermined value at the decision diamond 96, then the system start-up sequence provides a header purge for the anode side of the split stacks 12 and 14 at box 104. Once the anode pressure reaches a predetermined value, such as 107 kPa, at box 106, the system 10 provides normal anode flow-shifting at box 108 and a stack-fill at box 110. The system operation then returns to the box 98 for a normal system operation.

Figure 3:
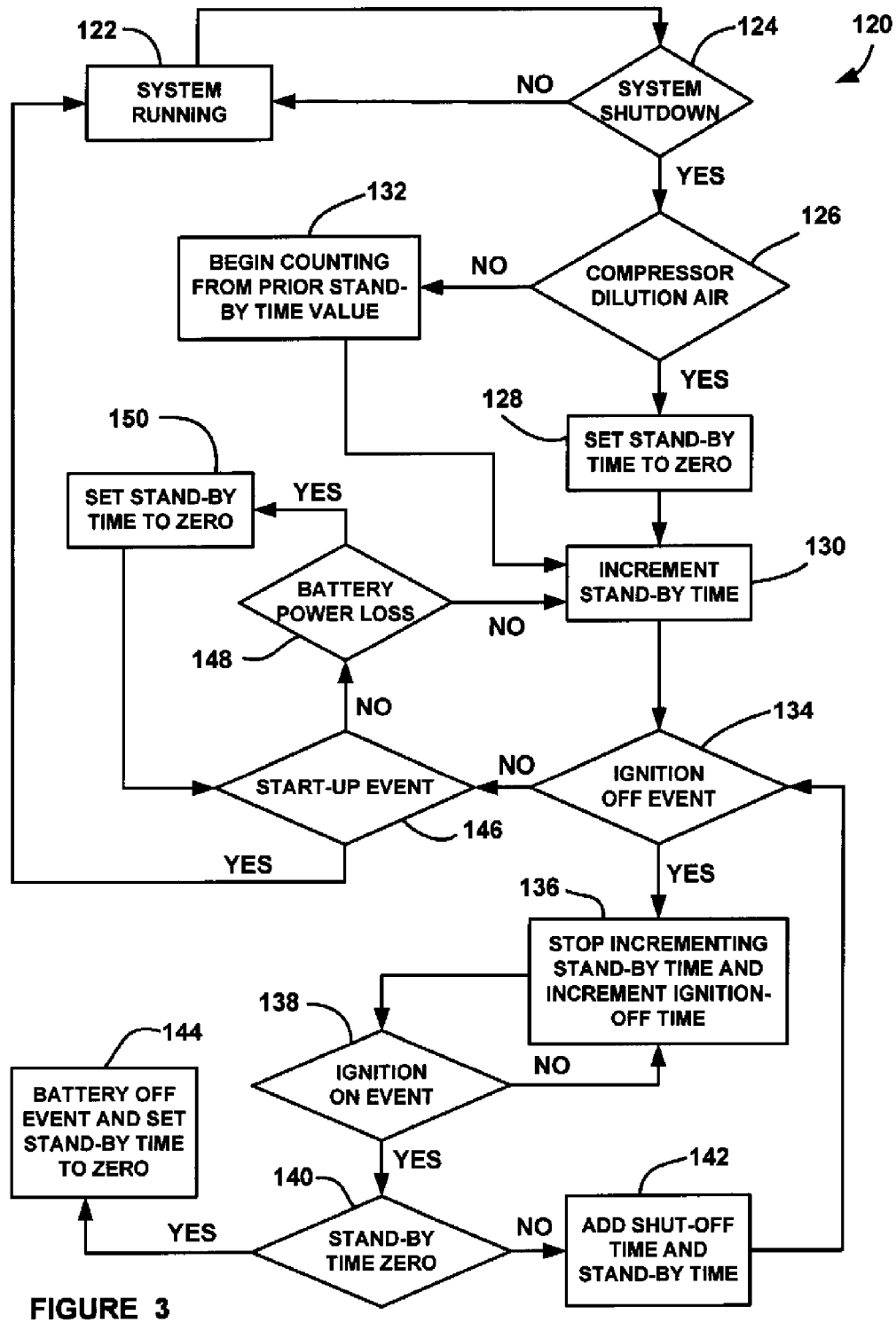
FIG. 3 is a flow chart diagram showing a method for providing a time count for how long a fuel cell system has been shut-down, according to an embodiment of the present invention.

FIG. 3 is a flow chart diagram 120 showing an operation for providing the stand-by time count and the shut-off-timer count discussed above during system shut-down. When the system 10 is running at box 122, the algorithm periodically determines whether there is a system shut-down at decision diamond 124. If there is a system shut-down at the decision diamond 124, the algorithm determines whether a next start-up sequence has reached a certain state where cathode dilution air is being provided at decision diamond 126. If the start-up sequence has not reached this state, then the stand-by timer continues counting from a previous stand-by count at box 132. If the start-up sequence has reached the cathode dilution state at the decision diamond 126, then the algorithm sets the stand-by time to zero at box 128. The algorithm then starts incrementing the stand-by timer at box 130.

The algorithm then determines if the ignition has been turned off at decision diamond 134. If the ignition has been turned off at the decision diamond 134, then the algorithm stops incrementing the stand-by time timer at box 136. The stand-by timer that provides the system off count while the ignition is on is stored. The shut-off timer now increments the time that the fuel cell system 10 has been shut-down.

The algorithm then determines if the ignition has been turned on at decision diamond 138 after the previous shut-down of the fuel cell system 10. If the ignition has not been turned on, then the shut-off timer continues to increment at the box 136. If the ignition has been turned on at the decision diamond 138, the algorithm determines if the shut-off time count is set to zero at decision diamond 140 to determine if there is a loss of battery power during the time the fuel cell system 10 was shut-down. If the shut-off time is not zero at the decision diamond 140, meaning that the timer had suitable power during the shut-down time, the algorithm adds the stored stand-by time to the stored shut-off time at box 142 to give the total off time that the split stacks 12 and 14 have been shut-down and sealed so that the algorithm can then determine the proper start-up sequence for the hydrogen flow to the anode side of the split stacks 12 and 14. The off-time algorithm then returns to the decision diamond 134 to determine whether the ignition had been turned off. If the shut-off time is zero at the decision diamond 140, then the algorithm knows that battery power has been lost, and sets the shut-off time to zero at box 144.

If there is not an ignition off event at the decision diamond 134, the algorithm continually determines whether the system 10 has been started at decision diamond 146 and, if so, returns to the system running box 122 to wait for the next system shut-down at the decision diamond 124. If the ignition is not off at the decision diamond 134, and there has not been a start-up event at the decision diamond 146, then the algorithm determines whether battery power has been lost at decision diamond 148 and, if not, increments the stand-by timer at the box 130. Thus, if the ignition has not been shut-off, there has not been a start-up event and there has not a battery loss of power, the fuel cell controller is running, but the system 10 has not been is started. Thus, the stand-by time continues to increment. If there is a loss of battery power at the decision diamond 148, then the algorithm sets the shut-off timer to zero at box 150, and returns to the decision diamond 146 to wait for a start-up event.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining how long a fuel cell system has not delivered hydrogen to an anode side of a fuel cell stack after a system shut-down, said method comprising:
   determining whether the system has been shut-down;
   incrementing a stand-by time if the system has been shut-down and a key is in a vehicle ignition;
   incrementing a shut-off off time if the system has been shut-down and the key is out of the vehicle ignition;
   determining whether the ignition has been turned on after a previous ignition off event;
   adding the stand-by time and the shut-off time to provide an off-time that can be used to determine the gas constituency in the anode side of the stack; and
   determining whether dilution air is being provided from a compressor to dilute anode exhaust.

2. The method according to claim 1 further comprising determining whether a fuel cell system battery has lost power when the ignition is off.

3. The method according to claim 2 further comprising setting the stand-by time to zero if the fuel cell system battery has lost power.

4. The method according to claim 1 further comprising setting the stand-by time to zero if the dilution air is being provided.

5. The method according to claim 1 wherein the fuel cell stack includes a first split stack and a second split stack that operate under anode flow-shifting.

6. The method according to claim 1 wherein the system shut-down includes sealing the cathode and anode side of the fuel cell stack.

7. The method according to claim 1 wherein the off-time is used to determine a proper start-up sequence of the fuel cell system.

8. A method for determining how long a fuel cell system in a vehicle has been shut-down, said method comprising:
   incrementing a stand-by time if the system has been shut-down, but a key is in a vehicle ignition in an on or accessory position;
   incrementing a shut-off off time if the system has been shut-down and the key is out of the vehicle ignition;
   adding the stand-by time and the shut-off time to provide a total system off-time;
   determining whether dilution air is being provided from a compressor to dilute anode exhaust; and
   setting the stand-by time to zero if the dilution air is being provided.

9. The method according to claim 8 further comprising determining whether a fuel cell system battery has lost power when the ignition is off.

10. The method according to claim 9 further comprising setting the stand-by time to zero if the fuel cell system battery has lost power.

11. The method according to claim 8 wherein the fuel cell stack includes a first split stack and a second split stack that operate under anode flow-shifting.

12. The method according to claim 8 wherein the system shut-down includes sealing the cathode and anode side of the fuel cell stack.

13. The method according to claim 8 wherein the total system off-time is used to determine a proper start-up sequence of the fuel cell system.

14. A method for determining how long split fuel cell stacks in a fuel cell system on a vehicle have been shut-down, said method comprising:
   incrementing a stand-by time if the split stacks have been shut-down, but a key is in a vehicle ignition and is in an on or accessory position;
   incrementing a shut-off off time if the split stacks have been shut-down and the key is out of the vehicle ignition;
   determining whether the ignition has been turned on after a previous ignition off event; and
   adding the stand-by time and the shut-off time to provide an off-time that can be used to determine the gas constituency in the anode side of the stack and determine a proper start-up sequence of the fuel cell system.

15. The method according to claim 14 further comprising determining whether a fuel cell system battery has lost power when the ignition is off.

16. The method according to claim 15 further comprising setting the stand-by time to zero if the fuel cell system battery has lost power.

* * * * *